Dec. 22, 1970 — W. T. GRUBB ETAL — 3,549,423
METHOD FOR MANUFACTURING FOAM TYPE ELECTRODE
Filed June 30, 1967 — 2 Sheets-Sheet 2
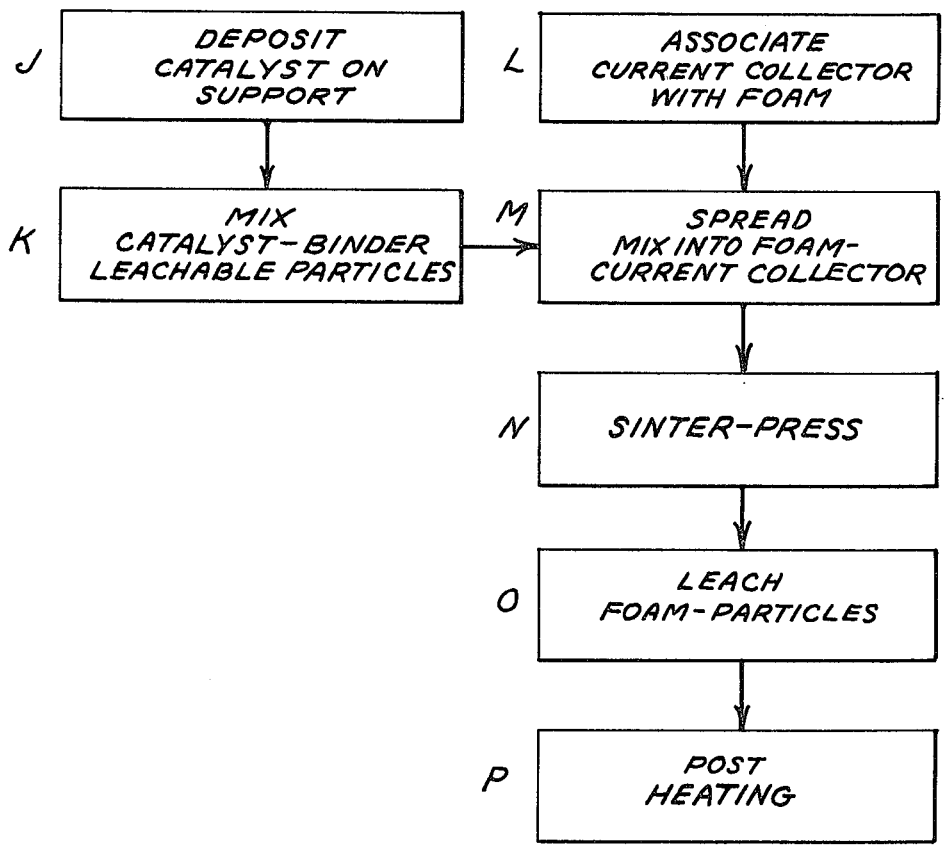
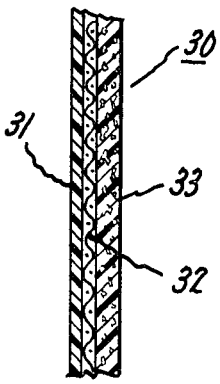
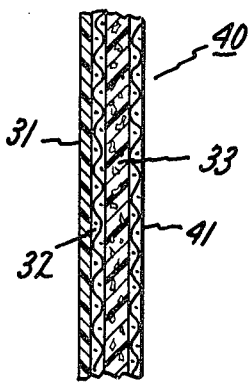
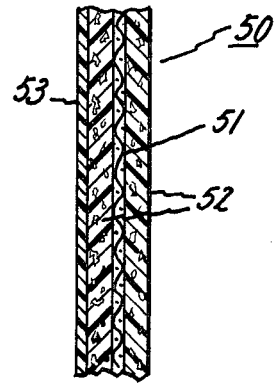
Inventors:
Willard T. Grubb,
Lawrence H. King,
by Paul R Webb, II
Their Attorney.

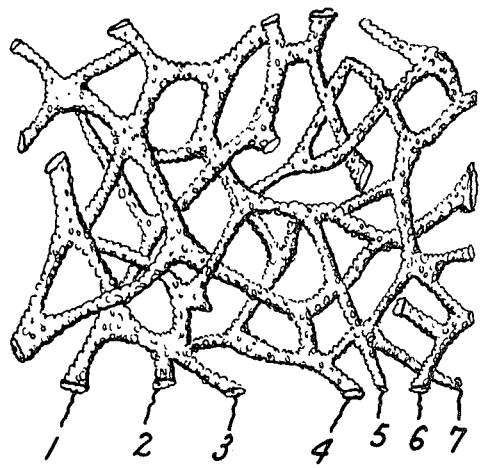
Fig. 1.
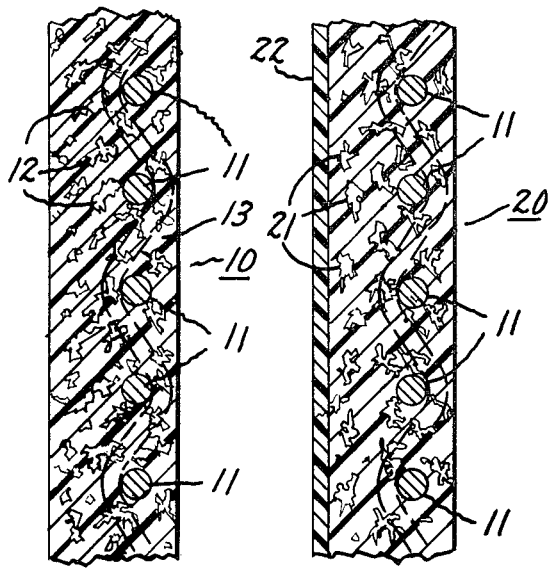
Fig. 3. Fig. 4.
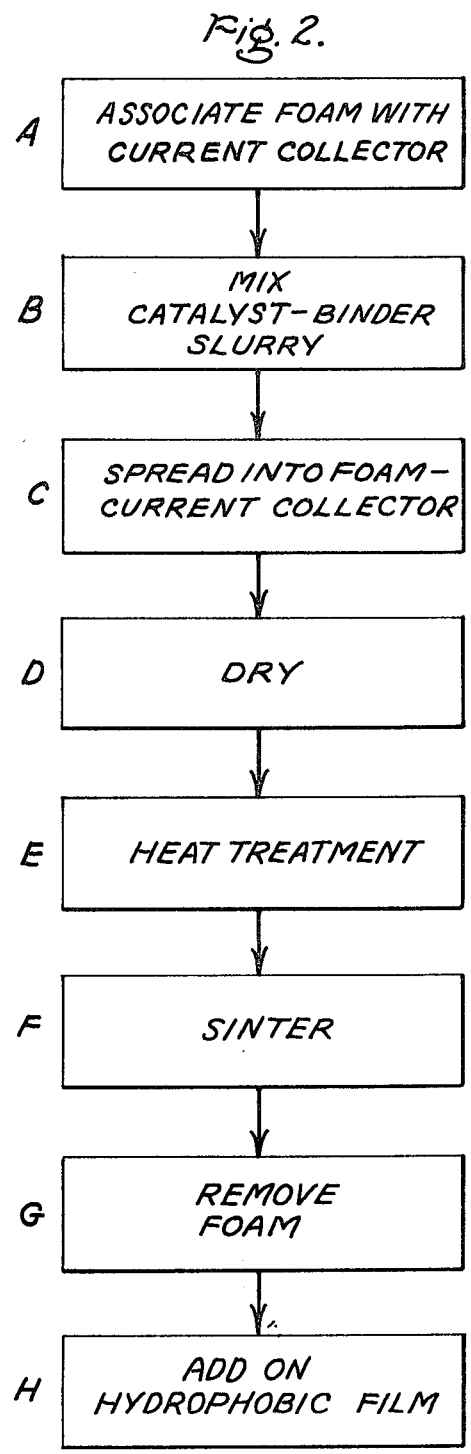
Inventors:
Willard T. Grubb,
Lawrence M. King,
by Paul R. Webb, II
Their Attorney.

United States Patent Office 3,549,423
Patented Dec. 22, 1970

3,549,423
METHOD FOR MANUFACTURING FOAM TYPE ELECTRODE
Willard T. Grubb and Lawrence H. King, Schenectady, N.Y., assignors to General Electric Company, a corporation of New York
Filed June 30, 1967, Ser. No. 650,512
Int. Cl. H01m 13/00
U.S. Cl. 136—120          4 Claims

ABSTRACT OF THE DISCLOSURE

An open cellular structural foam is associated with a current collector. An electrocatalytically active mass which can be a mixture of an electronically conductive composition and a binder is spread into the foam. The mass is dried, heat treated, and sintered after which the foam is leached. A hydrophobic polymer coating may be applied to one major surface of the electrode.

---

This invention relates to leached foam type electrodes and methods for their manufacture and, more particularly, to such electrodes and methods wherein a pore network is provided which has the geometric configuration of an open cellular foam.

If a strip of platinum is mounted at the interface of an oxidizable fluid and a liquid electrolyte, it can be made to function as an electrode by providing an electron flow path from the electrode to a counter electrode lying in contact with the electrolyte. The platinum strip acts as an electrode in being capable of catalyzing chemical reaction of the oxidizable fluid so that it receives electrons from the fluid without itself being chemically altered and, also, in being electronically conductive and thereby making a corresponding number of electrons available to the counter electrode through the electron flow path. A platinum strip also functions as an electrode in contact with a reducible fluid, although the direction of current is reversed. If one electrode is contacted with an oxidizable fluid while a second electrode in ionic communication therewith is contacted with a reducible fluid, the essential elements of a fuel cell are met. If, on the other hand, the counter electrode for a fluid electrode is a conventional primary or secondary electrode which is chemically altered on discharge, a hybrid type of cell is produced which partakes of some of the characteristics of a fuel cell and some of the characteristics of a conventional primary or secondary cell.

Electrodes in their most commonly used forms are highly porous, being so constructed in order to produce a large surface area interface of reactant and electrolyte in contact with the electrocatalyst. By increasing the extent of the three phase interface between reactant, electrocatalyst, and electrolyte the maximum power density that can be drawn from a fluid electrode is improved as is the efficiency with which the electrocatalyst is utilized. Since the pores of the electrode structures are the passages which the fluid reactant and electrolyte must enter to interact and since the pore linings provide the interface sites at which interaction occurs, consideration of the size, distribution, and geometry of the pores making up any given composition electrode is just as essential as consideration of the electrocatalytic activity or wettability of the materials to be incorporated, if an efficient electrode is to be obtained.

A variety of porous electrode constructions are known to the art. In perhaps the simplest form, a porous electrode may be constructed by compacting a finely divided electrocatalyst. The fine division of particles increases the surface area per unit weight and provides a large number of interstitial pores. Such an electrode is not particularly efficient, however. Since the electrolyte is selectively drawn into the pores by capillary attraction, the electrolyte may flood the electrode thereby preventing access of the reactant to the electrode. One suggested improvement has been to form an electrode in at least two layers—one layer being comprised of fine particles and another layer being comprised of larger particles. This facilitates maintaining the electrolyte-reactant interface within the electrode, but does not allow distribution of the electrolyte-reactant interface throughout the electrodes as is desired for most efficient utilization of the electrocatalyst. An alternate approach has been to mechanically locate large pores within an electrode construction. The disadvantage of this approach is that a relatively small number of large pores can be introduced and these pores extend through the electrode in a straight line, thereby failing to contact a large number of the interstitial pores. Also, it is difficult to mechanically form pores sufficiently small as not to be susceptible to direct mixing of reactant and electrolyte or, in the case of flow-through electrodes, not to cause flow to occur exclusively through the mechanically formed pores.

Another approach toward increasing the electrolyte-reactant interface within an electrode is to incorporate leachable particles within the electrocatalytically active mass making up the electrode. Although large pores having the geometric configuration of the leached particles may be formed in this manner, such pores are of little value toward increasing reactant penetrability of the electrocatalytic mass is surrounded entirely by smaller interstitial pores occluded by electrolyte.

From the foregoing, it is apparent that the art has long felt a need for electrodes capable of providing a larger reactant-electrolyte interface to achieve a more efficient utilization of electrocatalyst and to obtain high power densities. Nevertheless, prior to our invention no electrode construction has been available capable of providing an internal interface of reactant and electrolyte distributed to the desired degree by control of the size, distribution, and/or geometry of electrode pores. Among the most efficient electrodes developed to date are those which have relied primarily upon control of the wetting of pore linings in order to achieve a distributed internal interface.

It is an object of our invention to provide a novel electrode and method for its manufacture which provides incorporation of a pore network of improved distribution and geometry.

It is another object to provide an electrode and method for its manufacture which provides the combination of the above improved pore network with secondary pores.

It is a further object to provide a novel electrode and method for its manufacture which provides a novel composite interconnected pore system employing a pore network, secondary pores, and interstitial pores.

In accordance with our invention, an electrode comprises a fluid permeable electronically active mass with an internal pore network having the geometric configuration of an open cellular foam, and a current collector lying in electronically conductive relation with the mass. The electrode may include a gas permeable hydrophobic film overlying one surface. The electrocatalytic material may include a supported or unsupported electrocatalyst. The active mass may also define a plurality of secondary pores interconnecting with the pore network, which secondary pores have the geometric configuration of finely divided, elongated particles.

In another aspect, our invention is directed to a method for producing an electrode comprised of associating a current collector with a less noble open cellular structural foam, introducing into the voids of at least the open cellular structural foam a mixture of an electrocatalytically active material and binder, selectively removing at least a portion of the open cellular foam to form an electrode structure. A selectively removable additive may be incorporated into the mixture and at least partially removed subsequently from the electrode.

These and various other objects, features and advantages of the invention will be better understood from the following description taken in connection with the accompanying drawing in which:

FIG. 1 is a view, greatly magnified of a thin section of open cellular structural foam;

FIG. 2 is a block diagram of a method according to our invention;

FIG. 3 is a vertical sectional view, greatly magnified, of an electrode partially prepared according to our invention;

FIG. 4 is a view similar to FIG. 3 of a completed electrode structure formed according to our invention;

FIG. 5 is a block diagram of a method according to our invention;

FIG. 6 is a sectional view of a modified electrode;

FIG. 7 is a sectional view of a modified electrode; and

FIG. 8 is a sectional view of a modified electrode.

Electrodes of our invention may be advantageously constructed by employing any conventional current collector, subject only to the criteria that it be more noble than the open cellular structural foam which will be associated with the current collector and, hence, selectively separable therefrom by either a physical or chemical treatment of an electrode structure including both in intimate association. Titanium, tantalum, platinum metals, gold, silver, and alloys of these are commonly employed current collector materials. By way of illustration, it is noted that silver may be incorporated as either a foam or current collector material. If silver is used to form or coat the current collector then silver cannot be chosen as the foam material, since the foam material must be less noble; conversely, if silver is chosen as a foamed material, the current colector material choice is limited to more noble metals. For most electrode constructions, current collector constructions having a multiplicity of openings are preferred, such as screens, expanded metals, foamed metal, felt metal, etc. Screens are the most commonly used type of current collectors. It is preferred to use screens having a mesh size in the range of from 5 to 150 openings per lineal inch. It is recognized that imperforate metal plates have been used as current collectors in certain types of cell constructions and that these may be employed as elements of electrodes formed according to our invention.

Open cellular foam, which will be associated with the current collector, is characterized in being comprised of a three dimensional array of multiply and randomly interconnecting strand segments. A foam differs from a felt or other fibrous structure in that the strands are integrally united at their junctions so that the material cross-section of the junctions is at least as large as the segment cross-sections. By contrast, a felt or other fibrous structure lacks any bonding of strands at their points of tangency and, even if bonded, would exhibit a reduced cross-section at strand junctions. Such a reduced strand junction cross-section is, of course, undesirable to the practice of our invention for reasons noted subsequently.

In FIG. 1 of the drawings, there is shown a thin section, greatly magnified of a typical open cellular foam. Such as open cellular structural foam may be formed of a variety of materials. As used herein the term "structural foam" is used to indicate those foamed materials which are formed of solid phase materials and which are shape retaining when contacted with another material. Structural foams may be contrasted with liquid foams and froths which spontaneously deform or collapse on contact. While any structural foam may be employed, it is preferred to utilize foamed metals, since they are commercially available, sufficiently structurally rigid that even small individual strand segments are not readily damaged by contact, and yet deformable at elevated pressures. With some care to avoid damage to individual strand segments, it is anticipated that organic polymer foams may also be employed.

The open cellular foam is inherently porous. The parameters of porosity and strands per lineal inch efficiently fix the material content and its distribution in any given foam. Considering the simplicity of electrodes that meet the bare requirements of operability, it can be readily appreciated that foams of any porosity or strand count may be utilized with some degree of effectiveness. We have found foams in the range of from 1 to 20 percent by volume material and 99 to 80 percent by volume voids to be most efficient. Also, we prefer to use foams having from 10 to 100 strands per lineal inch, with 40 to 60 strands per lineal inch being most preferred. The strand count is made by laying a ruler against one edge of the foam and counting only those strands that physically lie in tangency with the edge of the foam. Thus, strands lying on the opposite face or interior of the foam are not counted. For example, if the foam in FIG. 1 of the drawing was assumed to be one inch in width and a ruler was positioned along the lower edge of the foam, seven strands would be counted. These strands are numbered 1–7 in this figure. While the thickness of the foam is not critical, thicknesses in the range of 0.5 to 5.0 mm. are recognized as efficient, with thicknesses in the range of from 0.5 to 3.0 mm. being preferred.

Any structural foam may be employed having the characteristics above outlined which can be selectively removed without physically disrupting or deforming the current collector, the electrocatalytically active mass associated with the current collector, any hydrophobic polymer film which may be in contact with the structural foam or current collector, or any other element of the electrode. In the case of foamed metal, it is preferred to utilize a metal which is less noble than the current collector or its coating metal so that the foam may be selectively leached by use of an acid, such as, for example, nitric acid. If an organic polymer foam is utilized, its selective removal by chemical reagents may be even more easily accomplished and other means of removal, such as selective burning out or vaporization of the foam may be utilized. Preferred foam metals include nickel, iron, cobalt, zinc, copper, silver, aluminum, magnesium, and alloys of any of these.

A variety of methods may be practiced in forming electrodes according to our invention. A preferred method is summarized in the block diagram of FIG. 2. Step A of the method calls for associating the current collector in electronically conductive relation with the open cellular foam which can be accomplished merely by laying the foam against the current collector. This is a very inefficient arrangement, however, since a large contact resistance will be present between the subsequent active mass and the current collector. To reduce the contact resistance to a minimum, it is preferred to press the foam against the current collector. In the preferred form, the current collector is formed of a material having a multiplicity of openings therein and the foam is pressed into the openings. This achieves a very intimate and efficient electrical contact between the subsequent active mass and current collector. It is preferred to apply sufficient pressure to the foam that it is deformed and at least partially extends into the openings in the current collector to lock the foam and current collector together into a unitary structure.

Step B of FIG. 2 calls for the blending of an electronically conductive, electrocatalytically active material or composition with a binder in an aqueous medium to form a paste or slurry of the desired consistency to facilitate spreading. Any conventional electrocatalyst commonly employed in electrodes may be used. Most electrocatalysts are themselves electronically conductive and may be used alone to form an electronically conductive, electrocatalytically active composition. Electrocatalysts which are not electronically conductive, such as spinels, may be used in finely divided form when blended with an electronically conductive material which will be resistant to direct chemical attack in the intended environment of use. The finely divided electronically conductive material may itself be an electrocatalyst, but this is not required. The binder may be any adhesive material that is not directly chemically attacked by the electrolyte or the reactant fluid of the cell in which the electrode is to be used. Various binders meeting this criteria are known to the art. Preferred binders are hydrophobic halocarbons, most preferably fluorocarbon binders, having a critical surface tension less than the surface tension of water. A preferred maximum critical surface tension is 32 dynes/cm. Critical surface tension is defined as the value of the liquid surface tension at which liquids spread on a given polymer surface. A full discussion of critical surface tension is provided at page 240, "Surface Chemistry Theory and Industrial Application" by Lloyd I. Osipow, Reinhold Publisher Corporation, New York, 1962. Perfluorinated polymers such as polytetrafluoroethylene and polyhexafluoropropylene possess the highest degree of hydrophobicity and chemical stability of presently known binders and are accordingly preferred. As is well understood to those skilled in the art, if a hydrophobic binder is to be placed in an aqueous medium, it may be necessary to incorporate a small amount of a wetting agent, such as a surfactant. "Teflon 30" is a trademarked named of a commercially available aqueous emulsion of polytetrafluoroethylene including a wetting agent and which is suitable for the practice of this method step.

According to Step C of the method, the paste or slurry formed by Step B is spread into the voids of the structural foam. While it is not necessary to completely fill the voids with the active mass of the binder and electrocatalytically active material, a proper choice of foam thickness will allow complete filling of the foam voids to give the desired loading of the slurry. The excess paste can be conveniently removed by passing a doctor blade or scraper across the surface of the foam. This constitutes a very simple method of achieving a uniform distribution of the paste within the foam.

Step D recites drying the loaded foam to remove the water content of the paste and leave a residual electrocatalytically active mass within the voids of the foam. This step may be completed by simply letting the loaded foam stand for sufficient time to permit ambient air to dry the structure. Usually it is preferred to facilitate moisture removal by heating at a temperature of about 150° C.

Step E of the method calls for heat treatment of the active mass for removal of water and wetting agent. It is preferred in this heat treatment to employ a temperature in the range of 250° C. to 280° C.

Step F of the method sets forth sintering the binder in the active mass. This is accomplished in a preferred manner by heating the structure to a temperature of 350° C. for a period from 2 to 10 minutes at a pressure of 7,000 to 8,000 lbs. for a diameter of 1⅞ inches.

In FIG. 3, there is shown a preferred, partially completed electrode construction 10 which is formed by practicing process steps A through F. As shown, the partially completed or intermediate electrodes construction comprises a plurality of evenly spaced screen strands 11 making up the current collector. Pressed into the openings between strands and distributed through the intermediate electrode construction is an open cellular structural foam 12. The voids in the screen and the foam are filled with electrocatalytically active mass 13. The active mass may incorporate a large number of interstitial pores which are too small and numerous to be individually shown.

The intermediate electrode construction shown in FIG. 3 is formed into a completed electrode structure 20 as illustrated in FIG. 4, by performing additional process Steps G and H diagrammatically illustrated in FIG. 2. Step G is to remove the structural foam without disrupting or deforming the electrocatalytically active mass in order to leave a pore network 21 having the geometric configuration of the structural foam. Whereas the foam is formed of a three dimensional array of multiply and randomly interconnecting strand segments, the pore network is comprised of a three dimensional array of multiply and randomly interconnecting pore segments. Just as the strand junctions are at least as large in cross-section as the strands themselves, the pore junctions are just as large in cross-section as the pore segments so that there are no constrictions in the pores at their junctions. While various approaches may be used in removing the foam from the intermediate construction to form the pore network as suggested above in discussing the choice of materials from which the foam may be constructed, it is generally preferred to use foamed metals that can be leached from the intermediate electrode construction using strong mineral acids, such as nitric acid, phosphoric acid, sulfuric acid, etc. It is noted that hydrochloric and other halogen containing acids HF are not preferred, since free halogen ions tend to poison electrocatalysts. It is noted that organic structural foams may be burned or volatilized out of the intermediate construction during the step of sintering. If such foamed materials are employed, the step of pressing should be conducted prior to or simultaneous with sintering, since pressing after removal of the foam will have the effect of tending to collapse the pore network.

After foam removal, the electrode structure will be complete for some cell applications. For example, the electrode structure may be used efficiently in combination with an ion exchange membrane, with a matrix containing an immobilized fluid electrolyte, as a flow-through electrode in which reactant passes through the electrode structure, or as an electrode with a liquid reactant.

Although the electrode structure formed by process Steps A through G may be used as a diffusion electrode lying at the interface of a gaseous reactant and a free aqueous electrolyte, it is preferred that for such applications a hydrophobic polymer film be applied to the gaseous contacting face of the electrode structure as indicated by process step H in FIG. 2. The choice of materials to form the polymer film is more restricted than the choice of binders in that hydrophilic materials are excluded from consideration. Similarly, as in the case of the binders, hydrophobic materials are preferred which are halocarbons and preferably fluorocarbons, with perfluoropolymers such as polytetrafluoroethylene and polyhexafluoropropylene being most preferred. The critical surface tension properties may differ from those of the binder, but preferably are within the same numerical ranges.

According to the preferred procedure for applying the hydrophobic polymer film, it is sprayed onto one surface of the electrode structure in the form of an aqueous emulsion containing a wetting agent. The spray coating is dried as it is sprayed to prevent running. This may be accomplished by maintaining the electrode structure in the temperature range of from 110 to 150° C. After the coating is formed to desired thickness, the electrode structure is raised to a temperature in the range of from 300 to 350° C. to sinter the coating in place and drive off the wetting agent. Another technique which may be employed in applying a hydrophobic polymer film is to laminate a very thin preformed film of polymer to one surface of the electrode structure. This can be done without the application of pressure merely by laying the preformed film on the surface of the electrode and bringing the composite structure to the sintering temperature.

In FIG. 4, the hydrophobic polymer film is schematically shown as 22 overlying one surface of electrode structure 20. While no pores are shown in the drawing, the polymer film is provided with a large number of distributed micropores. Since the material comprising the film is hydrophobic, the pore linings cannot be wetted by water and the film is accordingly selectively permeable to gaseous reactants and liquid reactants.

To summarize electrode properties with respect to a specific embodiment, FIG. 4 shows a preferred electrode structure 20 comprised of a screen current collector having strands 11. An electrocatalytically active mass 13 lies in intimate, electronically conductive relation with the current collector. The active mass is itself electronically conductive so that it can transfer electrons between the reaction sites and the current collector. The active mass preferably is comprised of a very finely particulated electronically conductive, electrocatalytically active material. This may be a common electrocatalyst, such as, for example, platinum black or any other conventional catalyst, or a supported electrocatalyst, such as, for example, an electrocatalyst deposited on the surface of finely divided particles of an electronically conductive material. The finely divided electrocatalytically active, electronically conductive composition is preferably admixed with a polymeric binder. The electronically conductive composition should be present in the proportion of at least 0.2 part per part of binder on a volume basis in order that the bonded active mass retain sufficient electronic conductivity. The active mass contains an internal pore network 21 having the geometric configuration of an open cellular foam. Although not visible in FIG. 4, the active mass also contains interstitial pores which permeate the mass while the hydrophobic polymer film 22 contains very small pores that are selectively penetrable by a reactant.

An alternate electrode forming method which offers certain advantages both in the method and the electrode structure produced is attained by a modification of Steps B and G in the method of FIG. 2.

Modified Step B of the method calls for depositing the electrocatalyst on a finely divided particulate support. Since electrocatalysis is a surface phenomenon and since the most effective electrocatalysts are for the most part expensive materials—usually platinum metals, forming the interior of even extremely finely divided particles of the electrocatalytically active elements represents a large financial penalty. It is an optional and preferred feature of our process that electrocatalysts be supported on other, less expensive materials in order to increase their surface area per unit weight. Any conventional deposition process may be employed for this purpose. Many useful techniques for chemically and electrolytically depositing electrocatalytically active elements and alloys from salt solutions are known and have been reported in the literature. Our preferred technique for depositing platinum is to thermally decompose in air a platinum salt on the surface of finely divided particles. The selection of salts is limited to those free of halogen to avoid poisoning the electrocatalyst. A preferred and well suited salt for this purpose is diaminodinitroplatinum. Any finely divided electronically conductive substrate may be employed that is chemically inert in the environment of use. Under the most stringent conditions of use—that is, when the support is to be used with a strong acid electrolyte, such as sulfuric, phosphoric, or hydrofluoric acid—it is preferred to employ boron carbide in finely divided form as a support. Carbon is also recognized as a preferred support.

The supported electrocatalyst in finely divided particulate form is mixed together with selectively removable particles, such as leachable particles and blended with a binder in an aqueous medium, as described above in Step B of FIG. 2, to form a paste or slurry of the desired consistency to facilitate spreading.

The removable particles must be selectively removable from the electrocatalytically active mass after sintering without disrupting or deforming the mass or any other element of the electrode structure. It will be appreciated that this is the same criteria that is applied to the structural foam. Accordingly, the removable particles may be constructed of the same materials as the foam. The removable particles are not limited to materials which can be made into structural foams, however. The use of leachable materials, such as citric acid, oxalic acid, ammonium carbonate, oxides of Group III, IV and V metals, iron oxide, colloidal alumina monohydrate, calcium metal silicate, etc. are contemplated. In order to provide pores of a large surface area per unit of volume displaced, it is preferred that the removable particles be shaped so that one dimension is at least twice the minimum dimension. Particles of this configuration may be obtained by chopping fine strands into short segments or in utilizing materials in the form of monoclinic or similarly elongated crystals. We have found calcium meta silicate to be a preferred removable material, since it is readily commercially available in proper form for use under the trademark "Cab-O-Lite." Another trademarked commercial material, "Cab-O-Sil" has been found to be beneficial, but is less preferred, since it lacks the elongated configuration believed necessary to yield optimum electrode performance. Both of the above products are manufactured and sold by the Cabot Corporation, Boston, Mass. The removable particles are for efficient performance incorporated in the electrode structure in an amount to account for from 0.1 to 10 percent by volume of the total electrode displacement. A more limited preferred range is from 0.3 to 3 percent by volume with the range of from 0.5 to 1.5 percent by volume being most preferred.

Modified Step G which leaches the foam and removable particles from the electrode structure, may be conducted similarly as Step G described above with the only difference being in the result of producing both an interconnecting pore network and also randomly distributed secondary pores. It is recognized that the same chemical reagent may not in all instances remove both the foam and the particles so that multiple leaching steps may be required utilizing more than one chemical reagent. For example, while foam metal may be efficiently removed utilizing nitric acid, the removable particles may be resistant to acid attack but readily removable using a strong alkaline reagent, such as sodium hydroxide.

The resulting electrode structure may to all appearances look similar to that illustrated in FIG. 4. The electrode will differ from the electrode 20, however, in the important respect of having a large number of small pores of the geometric configuration of the removed particles randomly distributed throughout the electrocatalytically active mass. Because of the high surface area of the pore network within the active mass, many of these secondary pores will interconnect with the pore network and form, in effect, small channels branching from the pore network and greatly increasing the accessibility of the still smaller interstitial pores within which the electrolyte is held by capillary forces. Thus, the secondary pores function to improve the distribution of the fluid reactant to the interstitial pores and results in a more widely distributed reactant-electrolyte interface. This is in turn reflected in improved performance for electrodes formed by this technique.

In FIG. 5, there is depicted by means of block diagrams a variant of the electrode forming method which offers certain advantages both in the method and the electrode structure produced.

Step J of the method sets forth depositing electrocatalyst on a finely divided particulate support. Since electrocatalysis is a surface phenomenon and since the most effective electrocatalysts are for the most part expensive materials—usually platinum metals, forming the interior of even extremely finely divided particles of the electrocatalytically active elements represents a large financial penalty. It is an optional and preferred feature of our process that electrocatalysts be supported on other, less expensive materials in order to increase their surface area per unit weight. Any conventional deposition process may be employed for this purpose. Many useful techniques for chemically and electrolytically depositing electrocatalytically active elements and alloys from salt solutions are known and have been reported in the literature. Our preferred technique for depositing platinum is to thermally decompose in air a platinum salt on the surface of finely divided particles. The selection of salts is limited to those free of halogen to avoid poisoning the electrocatalyst. A preferred and well suited salt for this purpose is diaminodinitroplatinum. Any finely divided electronically conductive substrate may be employed that is chemically inert in the environment of use. Under the most stringent conditions of use—that is, when the support is to be used with a strong acid electrolyte, such as sulfuric, phosphoric, or hydrofluoric acid—it is preferred to employ boron carbide in finely divided form as a support, carbon is also recognized as a preferred support.

In the method of FIG. 5, the supported electrocatalyst in finely divided particulate form is mixed with a similarly divided binder together with selectively removable particles, such as leachable particles. This step is represented by block K in FIG. 5. The binder may be chosen from among those described with reference to Step B in FIG. 2. The removable particles must be selectively removable from the electrocatalytically active mass after sintering without disrupting or deforming the mass or any other element of the electrode structure. It will be appreciated that this is the same criteria that is applied to the structural foam. Accordingly, the removable particles may be constructed of the same materials as the foam. The removable particles are not limited to materials which can be made into structural foams, however. The use of leachable materials, such as citric acid, oxalic acid, ammonium carbonate, oxides of Group III, IV, and V metals, iron oxide, colloidal alumina monohydrate, calcium meta silicate, etc. are contemplated. In order to provide pores of a large surface area per unit of volume displaced, it is preferred that the removable particles be shaped so that one dimension is at least twice the minimum dimension. Particles of this configuration may be obtained by chopping fine strands into short segments or in utilizing materials in the form of monoclinic or similarly elongated crystals. We have found calcium meta silicate to be a preferred removable material, since it is readily commercially available in proper form for use under the trademark "Cab-O-Lite." Another trademarked commercial material, "Cab-O-Sil" has been found to be beneficial, but is less preferred, since it lacks the elongated configuration believed necessary to yield optimum electrode performance. Both of the above products are manufactured and sold by the Cabot Corporation, Boston. The removable particles are for efficient performance incorporated in the electrode structure in an amount to account for from 0.1 to 10 percent by volume of the total electrode displacement. A more limited preferred range is from 0.3 to 3 percent by volume with the range of from 0.5 to 1.5 percent by volume being most preferred.

According to Step L of the process, the current collector and foam are associated prior to introducing the particulate mixture of supported electrocatalyst, binder, and removable particles. This method offers the advantage of allowing filling of all the voids of both the foam and current collector, rather than relying on pressing to fill the voids of the current collector. Since the material which is to constitute the active mass is blended in the form of a dry powder or a dry particulate mixture, the step of drying can be omitted. It is noted parenthetically that the requirement of blending dry powders does not limit the choice of binders, since the binder even if tacky at room temperature can be frozen and ground to the desired particle size. The loaded foam-current collector composite is sintered in Step N similarly as in Step F described above, except that it is unnecessary to elevate the temperature to any specific level for the purpose of driving off volatile impurities, since none are in this instance contemplated. Pressing is preferably conducted simultaneously, but this is not necessary. Step O, which leaches the foam and removable particles from the electrode structure, may be conducted similarly as Step G described above with the only difference being in the result of producing both an interconnecting pore network and also randomly distributed secondary pores. It is recognized that the same chemical reagent may not in all instances remove both the foam and the particles so that multiple leaching steps may be required utilizing more than one chemical reagent. For example, while foam metal may be efficiently removed utilizing nitric acid, the removable particles may be resistant to acid attack but readily removable using a strong alkaline reagent, such as sodium hydroxide.

Step P calls for additional heating. This step is conducted in the same general manner as Steps F and N, previously described. It has been discovered quite unexpectedly that an additional sintering treatment further enhances electrode performance, although the reason for this is not understood. In view of the highly porous character of the electrode being sintered, no pressure is applied during this step. Process Step P may be practiced with the processes of both FIGS. 2 and 5.

The resulting electrode structure may to all appearances look similar to that illustrated in FIG. 4. The electrode will differ from the electrode 20, however, in the important respect of having a large number of small pores of the geometric configuration of the removed particles randomly distributed throughout the electrocatalytically active mass. Because of the high surface area of the pore network within the active mass, many of these secondary pores will interconnect with the pores network and form, in effect, small channels branching from the pore network and greatly increasing the accessibility of the still smaller interstitial pores within which the electrolyte is held by capillary forces. Thus, the secondary pores function to improve the distribution of the fluid reactant to the interstitial pores and results in a more widely distributed reactant-electrolyte interface. This is in turn reflected in improved performance for electrodes formed by this technique.

While the methods of FIG. 2 with modified Steps B and G, FIG. 3 combinations, and obvious variations thereof are preferred for the practice of our invention, it is recognized that our electrode structures may be formed by a variety of alternate procedures. For example, a very simple electrode structure according to our invention may be formed by electrolytically depositing an electrocatalyst, such as silver, on a foamed material as previously described. Upon leaching or otherwise removing the foam strands, a pore network will be left having the electrocatalyst confined to the surface of the pores. This allows for efficient utilization of the electrocatalyst present, although the electrode structure would not be expected to support large current densities. The voids between foam strands may be filled, if desired, with a fluid impervious material. Alternatively, a large thickness of foam may be employed and compressed before or after electroplating. According to another process of forming our novel electrode structure, an electrocatalyst may be electrophoretically deposited within an open cellular structural foam. According to still another process variation, an electrocatalyst in finely divided form may be spread into the voids of a foam without being blended with a binder. The electrocatalyst may be suitably compacted during pressing to form a unitary, coherent mass. Alternately, one or more current collectors may be associated with the electrocatalyst to physically hold it in the desired structural configuration.

Electrodes formed according to our invention are characterized in being comprised of a fluid permeable electrocatalytically active mass defining an internal pore network having the geometric configuration of an open cellular foam. The electrode must include a current collector or its functional equivalent lying in electronically conductive relation with the active mass. Ordinarily, current collectors are separate structural elements as described previously, but it is recognized that it is possible for one or more materials to be added to or increased in proportion within the active mass for the purpose of improving electronic conductivity. For example, on occasion extra amounts of electrocatalyst are incorporated in electrodes beyond that required for electrocatalysis merely for the purpose of relieving resistive polarization.

Electrocatalysts per se and electrocatalytic compositions are sufficiently well known in the art as to require no additional discussion. Preferred electrode structures include a binder as a part of the active mass, and preferably a hydrophobic binder since this results in producing hydrophobic linings on interstitial pores and reduces the electrolyte content of these pores. Preferred binders are halocarbons, preferably fluorocarbons, and most preferably perfluorocarbons.

Although not necessary to operability, it is preferred that the pore network exhibit a volume in the range of from 1 to 30 percent of the total volume displacement of the active portion of the electrode. The pore network preferably provides from 10 to 100 pores per lineal inch measured along a major surface of the electrode structure. From 0.1 to 10 percent of the total volume displacement of the active portion of the electrode may, preferably, be accounted for by secondary pores uniformly and randomly distributed throughout the active mass. These secondary pores are larger than interstitial pores, but are smaller in their maximum dimensions than the minimum dimensions of the pore segments which they intersect. A preferred range of volume displacement for the secondary pores is 0.3 to 3 percent by volume, with 0.5 to 1.5 percent by volume being considered an optimum range.

In electrode structure 20 in FIG. 4, it can be seen that the hydrophobic polymer film 22 is positioned on the "foam side" of the electrode—that is, the polymer film lies on the same side of the current collector as did the foamed material prior to its being removed. FIG. 6 shows as an alternate construction an electrode 30 having the hydrophobic polymer film 31 positioned adjacent one face of the current collector 32 with the active mass 33 lying adjacent the opposite face. FIG. 6 is, of course, a schematic showing. In actual practice the active mass would most likely be pressed into the current collector so that it would lie to some extent on both sides of the current collector, although principally on the face opposite the hydrophobic film—even after pressing.

FIG. 7 illustrates schematically an electrode 40 which differs from electrode 30 in having a second current collector 41 so that the active mass is contacted along both major faces. This arrangement improves both the strength and electrical conductivity of the electrode structure.

FIG. 8 illustrates schematically an electrode 50 having a current collector 51 lying between identical active masses 52. A hydrophobic film 53 is positioned adjacent a major face of one active mass. Although omitted from the schematic showings, each of electrodes 30, 40, and 50 is provided with an interconnecting pore network distributed within the active mass.

It is considered to be well within the skill of the art to construct electrodes formed according to our invention into any configuration necessary to allow substitution for any conventional electrode. It is noted that most applications call for planar electrode constructions, although open and closed ended cylindrical electrodes are also frequently used. It is recognized that our electrodes may be provided with auxiliary conventional features to facilitate mounting and electrical interconnection, such as edge gaskets molded into peripheral current collector extensions, electrical tabs connected to or formed integrally with the current collector, etc. All previously included recitations of volume percentages have, however, excluded electrode portions lying outside the electrocatalytically active area of the electrode, since this would merely serve to complicate and confuse electrode comparisons.

Electrodes formed according to our invention are well suited for use in all types of fuel cells. It is apparent that electrodes formed according to our invention incorporating polymer films or binders must, however, be restricted in use to cells operating below the degradation temperature of the binder. Such electrodes are well suited for use with aqueous electrolyte fuel cells, such as sulfuric acid electrolyte fuel cells, phosphoric acid electrolyte fuel cells; hydrofluoric acid electrolyte fuel cells; aqueous potassium hydroxide, carbonate, and bicarbonate electrolyte fuel cells; and fuel cells incorporating ion exchange membranes. Our electrodes are also well suited for use as electrodes in hybrid cells having only one electrode, such as magnesium-air cells, zinc-air cells, aluminum-air cells, etc. Electrodes formed according to our invention are suitable for the electrocatalytic reaction of all conventional fuels and oxidants employed with fuel cells and hybrid cells, such as air cells.

It is considered that our invention may be more fully appreciated by reference to the following working examples.

A plurality of supported electrocatalysts were prepared according to the general procedure of adding 5 grams of particulate boron carbide sold commercially under the trademark "Norbide" to 6.25 cc. of an aqueous nitric acid solution of diaminodinitroplatinum. The salt solution containing the platinum salt was heated on a hot plate at 100 to 110° C. for 60 minutes while being stirred with a fluorocarbon bar to prevent caking. The platinum treated boron carbide particles were then removed from solution, dried in an oven at 150° C. for 60 minutes, and subsequently ground with a boron carbide mortar and pestle. The above procedure was repeated a sufficient number of times to achieve the desired platinum content. The final material passing through a 400 mesh nylon sieve was utilized as the catalyst. Table I correlates the electrocatalyst code number with the percentage by weight of platinum, based on the total weight of the sample, it contains. Sample 84X differs from sample 84 only in being heated on the hot plate to 150–200° C. For convenience, Table I also correlates the electrocatalyst with the code number of the electrode in which it was employed.

TABLE I

| Electrocatalyst No.: | Weight percent platinum | Electrode No. |
|---|---|---|
| 77 | 16.7 | 285 |
| 77 | 16.7 | 286 |
| 87 | 16.7 | 586 |
| 80 | 16.7 | 325 |
| 80 | 16.7 | 336 |
| 84X | 28.6 | 449 |
| 80 | 16.7 | 345 |
| 81 | 16.7 | 353 |
| 80 | 16.7 | 334 |
| 80 | 16.7 | 348 |
| 84X | 28.6 | 448 |
| 82 | 28.6 | 324 |
| 82 | 28.6 | 413 |
| 82 | 28.6 | 315 |
| 81 | 16.7 | 366 |
| 80 | 16.7 | 330 |
| 81 | 16.7 | 376 |
| 81 | 16.7 | 377 |
| 82 | 28.6 | 414 |
| 84 | 28.6 | 436 |
| 84 | 28.6 | 461 |
| 84X | 28.6 | 469 |
| 84 | 28.6 | 444 |
| 84 | 28.6 | 446 |
| 84 | 28.6 | 473 |

Several electrodes of conventional construction were identically formed according to the general procedure described by Niedrach and Alford in an article entitled "A New High-Performance Fuel Cell Employing Conducting-Porous-Teflon Electrodes and Liquid Electrolytes" published in the Journal of the Electrochemical Society at vol. 112, No. 2, dated February 1965. The electrodes employed 45 mesh screen with 7.5 mil strands as current collectors. The screens were one and seven-eighths inches in diameter, and the completed electrodes exhibited centered circular active areas of 11.4 cm.$^2$. A total of 0.70 gram of platinum black was utilized evenly distributed between the two faces of each screen. The electrocatalytically active mass consisting essentially of the platinum black and polytetrafluoroethylene (PTFE) binder was 10 percent by weight PTFE. The electrodes were formed with a 0.6 mg./cm.$^2$ PTFE hydrophobic film on one side. The slurry of PTFE and platinum black utilized was air dried and then sintered at 250° C. for 30 minutes. Pressing was accomplished at 8,000 lbs. for 2 minutes at 350° C.

One of the electrodes formed by the above conventional construction was assigned number 404 and tested along with the novel electrodes of the present invention for purposes of comparison. Another platinum black electrode of the above conventional construction was mounted in a fuel cell fixture and utilized as a counter electrode. For purposes of testing, a plurality of identical fuel cell fixtures were utilized similar to those disclosed in the above Niedrach and Alford article. A 3/8 inch electrolyte gap was employed instead of a 1/8 inch gap. 6 N sulfuric acid was utilized as the electrolyte. The electrode to be tested was mounted in the fuel cell fixture and exposed on one side to ambient air, which was utilized as reducible reactant. The counter electrode, which was of conventional construction as described above, was utilized as a hydrogen electrode. It was chosen to test the electrodes formed according to the invention as air electrodes rather than hydrogen electrodes, since the reduction of oxygen from air is a much more stringent test of electrode efficiency and capability than the oxidation of hydrogen, which is a very easily oxidized fluid.

A number of electrodes to be tested of both novel and conventional construction were formed by similar procedures. In each instance a 45 mesh platinum screen of 7.5 mil strand size with a 1⅞ inch diameter was initially weighed out. Next, a measured amount of an electrocatalyst sample and a PTFE binder in the form of an aqueous emulsion were combined to form an easily spread mixture. The electrocatalyst-binder mixture was pasted into the screen and air dried. After drying, the pasted electrode was cured at a sintering temperature. In most instances, the electrode was pressed at an elevated temperature and leached in acid and subsequently in distilled water before a PTFE film of uniform and known density was applied by spraying a dilute aqueous emulsion onto one face. The electrode was then cured at an elevated temperature to sinter the PTFE film.

Control electrode 285 was prepared according to the above procedure to compare its performance as an unpressed conventional pasted electrode including a supported electrocatalyst but lacking any leachable additive. The pasted screen was heated at 250° C. for 30 minutes after drying. The PTFE film was applied in 8 sprayings each of which had 0.6 mg./cm.$^2$ of film and cured at 350° C. for 2 minutes. The step of pressing was in this instance omitted. Although no leachable additive was thought to be present, for the sake of comparability, the electrode was soaked for 1 hour in 50 percent by volume nitric acid maintained near boiling and then rinsed for 1 hour in distilled water. The physical characteristics of this and other electrodes are set out in Table II.

A control electrode 286 was prepared to compare its performance as a pressed conventional pasted electrode including a supported electrocatalyst but lacking any leachable additive. The same procedure was followed as in the preparation of electrode 285, except that subsequent to sintering the pasted screen, the electrode was pressed for 10 minutes at 350° C. and 7,000 to 8,000 lbs. Leaching was conducted for 2 hours and rinsing for 4 hours.

In order to provide a control electrode of conventional pressed construction incorporating a leachable additive, an electrode 586 was formed by the following procedure. Platinum-activated boron carbide in the amount of 0.444 gram containing 0.074 gram of platinum supported on 0.370 gram of non-stoichiometric boron carbide was dry blended with 0.022 gram of calcium metal silicate (Cab-O-Lite) and then mixed with 0.078 gram of Teflon as an aqueous suspension plus enough water to give a slurry of suitable consistency for pasting. This slurry was applied to a platinum screen on a circular area of 1⅞ inch diameter. After drying in air for about 15 hours, the electrode was heated in an air oven at 280° C. for about 30 minutes, and it was then press-cured at 350° C. using a press force of 7,000 to 8,000 lbs. This electrode was leached in a solution of 90 parts water, 10 parts nitric acid, and 1 part hydrofluoric acid to remove the calcium meta silicate additive and sprayed with a Teflon suspension to form a hydrophobic film of Teflon on one side in the amount of about 2.4 milligrams per square centimeter of electrode area. The sprayed film was cured at 350° C. and the finished electrode was post-heated at 280° C. for about 30 minutes.

To illustrate the formation of a typical leached foam electrode formed according to our invention, electrode number 325 was formed by the above general procedure as follows: A screen as indicated above was pressed against a 1/16 inch thick co-extensive piece of nickel foam having 50 strands per lineal inch at 20,000 lbs. and 350° C. The screen-foam composite was pasted with an aqueous platinum-binder slurry and allowed to air dry overnight. Heat treating was conducted at 250° C. for 30 minutes, and, after cooling for 30 minutes, the electrode was pressed at 7,000 to 8,000 lbs. for 10 minutes at 350° C. The pressed electrode was leached for five hours in nitric acid. A PTFE film was applied in four sprayings, each of which provided a 0.6 mg./cm.$^2$ film. The same procedure was used to form electrode 336, which differs slightly in catalyst content and binder proportion. Electrode 449 was prepared by the same procedure, with the foam weight being increased from 0.83 gram in the case of electrode 325 to 1.434 grams. The increase in foam weight is reflected in Table II as an increase in the pore network volume from 7.8 to 20.4 percent. Electrode number 345 is another electrode incorporating a heavy foam (1.350 grams). This electrode was formed as electrode 325, except that air drying was curtailed to four and one-half hours and leaching was conducted for five and one-half hours.

Electrode number 353 was formed according to the procedure for electrode 325, but the step of sintering under pressure was varied so that sintering was conducted for 2 minutes at 350° C. without pressing. Also, leaching was extended from 5 to 7 hours. This illustrates that pressing is not an essential step of the process. Electrode number 334 was formed according to the procedure for electrode 325, but the step of pressing the foam and screen together was varied so that a force of only 2,000 lbs. was used. Electrode number 348 was formed similarly as electrode number 334, differing primarily in using a somewhat heavier foam, as ilustrated by the increase in pore network volume. Electrode number 448 was formed according to the same procedure as electrode number 325, except that the foam was preliminarily etched in dilute nitric acid from a weight of 1.139 grams to 0.712 gram.

Electrode number 324 was formed according to the procedure for electrode 325, and illustrates the use of higher proportion of PTFE binder. Electrode numbers 413 and 415 illustrate electrodes formed by the same procedure having binder contents of 15 and 10 percent, respectively.

Electrode numbers 366 and 330 were formed according to the same procedure as electrode number 325 in order to illustrate the use of two screens (366) or two thicknesses of foam (330). The relationship of foam and screen are indicated in Table II in the column titled Geometry. Electrode number 376 was formed with two foam substrates of about the same weight (1.001 grams on the reactant side vs. 0.948 gram on the electrolyte side). In order to increase the porosity on the electrolyte side of the screen, the foam was pressed at 20,000 lbs. while the foam on the reactant side was subsequently positioned and pressed on at 3,000 lbs. Electrode number 377 illustrates the converse arrangement, with a 1.000 gram foam substrate on the reactant side being pressed at 20,000 lbs. and the 0.983 gram substrate on the electrolyte side subsequently being pressed on at 3,000 lbs.

Electrode number 414 was prepared according to the procedure of electrode 325, except that a post sintering step was added after the PTFE film had been given a 2 minute 350° C. sinter. The additional sintering step was performed at 310° C. for a period of 10 minutes and a preceding period of about 20 minutes in which the hot plate was being brought to temperature.

To illustrate the beneficial effect of providing leachable particles in combination with the leachable nickel foam, electrode number 436 was prepared according to the procedure used to form electrode 325, except that 5 percent by weight of the electrocatalytically active mass was accounted for by silica in finely divided form (trademarked "Cab-O-Sil"). It is noted that on a volume basis, considering all of the elements of the electrode, the silica accounted for less than one percent by volume, as indicated in Table II. The silica was leached with 50% hot sodium hydroxide immediately following leaching of the foam with nitric acid. Electrode number 461 is essentially repetitious of electrode 436, but is of interest by reason of the lower catalyst loading, as indicated in Table II. Electrode 469 is also essentially repetitive, but shows the substitution of 5 percent by weight crocidolite for 5 percent by weight silica. The nickel foam used was in this instance preliminarily etched from 1.288 grams to 0.796 gram.

To illustrate the further advantage of employing leachable particles having a minimum dimension less than one half the maximum dimension, in order to increase the surface area of the pore formed, electrodes 444, 446, and 473 were fabricated. Electrode 444 was formed according to the same procedure as electrode 436, except that 5 percent by weight calcium meta silicate was substituted for 5 percent by weight silica. The calcium meta silicate was a finely divided form sold commercially under the trademark "Cab-O-Lite." Leaching was accomplished by soaking the electrode for 3 hours in 90 percent by weight nitric acid, then 2 hours in 89 percent by weight water, 10 percent nitric acid, and 1 percent hydrofluoric acid. Electrode 446 illustrates a much higher leachable particle loading differing in preparation in that a single 6 hour leaching with 89 percent by weight water, 10 percent nitric acid, and 1 percent hydrofluoric acid was employed. Electrode 473 was prepared similarly as electrode 446, with the added step of post heating on a hot plate at 310° C. for 30 minutes and cooling for 30 minutes, similarly as the post treatment applied to electrode 414. In the preparation of each of the electrodes incorporating leachable particles, the particle size was chosen to be larger than the interstitial pores but to have a maximum dimension less than the minimum dimension of the foam strand segments.

In TABLE II in the column labeled "PTFE Binder (wt. percent)," the weight percentage is of the binder in the electrocatalytically active mass. In the same table in the column labeled "Geometry," the geometry shows the relative position of electrode elements in the cell, where R strands for reactant, H for PTFE film, S for screen, F for leached foam, and E for electrolyte.

TABLE II

| Electrode No.: | Pt loading (mg./cm.$^2$) | PTFE binder (wt. percent) | PTFE film (mg./cm.$^2$) | Electrode thickness (in.) | Geometry | Void volume (vol. percent) | Pore network volume (vol. percent) | Leached particle volume (vol. percent) |
|---|---|---|---|---|---|---|---|---|
| 404 | 45.00 | 10.0 | 0.6 | .0116 | RHSE | 53.1 | 0 | 0 |
| 285 | 5.71 | 20.0 | 4.8 | .0296 | RHSE | 66.3 | 0 | 0 |
| 286 | 4.88 | 20.0 | 2.4 | .0158 | RHSE | 42.5 | 0 | 0 |
| 586 | 4.16 | 15.0 | 2.4 | .0175 | RHFSE | 54.2 | 0 | 0.97 |
| 325 | 2.18 | 10.0 | 2.4 | .0264 | RHFSE | 76.4 | 7.8 | 0 |
| 336 | 1.79 | 23.0 | 2.4 | .0142 | RHSFE | 58.5 | 8.0 | 0 |
| 449 | 4.52 | 15.0 | 2.4 | .0175 | RHFSE | 64.3 | 20.4 | 0 |
| 345 | 1.53 | 23.0 | 2.4 | .0147 | RHSFE | 61.9 | 22.8 | 0 |
| 353 | 1.65 | 23.0 | 2.4 | .0141 | RHSFE | 59.3 | 16.0 | 0 |
| 334 | 3.00 | 23.0 | 2.4 | .0167 | RHSFE | 56.6 | 10.7 | 0 |
| 348 | 3.34 | 23.0 | 2.4 | .0214 | RHSFE | 64.4 | 15.5 | 0 |
| 448 | 3.58 | 15.0 | 2.4 | .0134 | RHFSE | 57.0 | 12.3 | 0 |
| 324 | 2.25 | 36.4 | 2.4 | .0257 | RHFSE | 72.9 | 7.5 | 0 |
| 413 | 3.76 | 15.0 | 2.4 | .0160 | RHFSE | 63.3 | 14.9 | 0 |
| 415 | 4.07 | 10.0 | 2.4 | .0160 | RHFSE | 63.3 | 15.0 | 0 |
| 366 | 4.64 | 23.0 | 2.4 | .0468 | RHSFSE | 72.3 | 23.0 | 0 |
| 330 | 1.45 | 23.0 | 2.4 | .0171 | RHFSFE | 67.7 | 13.1 | 0 |
| 376 | 2.37 | 23.0 | 2.4 | .0219 | RHFSFE | 70.1 | 22.1 | 0 |
| 377 | 2.39 | 23.0 | 2.4 | .0113 | RHFSFE | 69.4 | 23.2 | 0 |
| 414 | 4.30 | 15.0 | 2.4 | .0156 | RHFSE | 60.6 | 13.8 | 0 |
| 436 | 3.15 | 10.0 | 2.4 | .0145 | RHFSE | 62.5 | 19.7 | 0.69 |
| 461 | 1.97 | 15.0 | 2.4 | .0122 | RHFSE | 59.6 | 18.6 | 0.56 |
| 469 | 3.38 | 15.0 | 2.4 | .0137 | RHFSE | 58.7 | 14.5 | 0.52 |
| 444 | 3.28 | 15.0 | 2.4 | .0156 | RHFSE | 64.0 | 11.3 | 0.53 |
| 446 | 3.28 | 15.0 | 2.4 | .0162 | RHFSE | 65.3 | 16.9 | 1.92 |
| 473 | 3.65 | 15.0 | 2.4 | .0141 | RHFSE | 58.9 | 14.4 | 0.61 |

The electrodes formed were tested under comparable conditions against substantially identical counter electrodes. One of the electrodes corresponding to the counter electrode construction, electrode 404, was also tested to show the superiority of our inventive electrodes. In each instance the electrodes were mounted in the fuel cell fixture with the PTFE film side adjacent the reactant.

Table III illustrates the comparative performance of the tested electrodes. By far the most important criteria of electrode performance from an economic point of view is the current obtainable per unit weight of platinum at a given voltage for any electrode. In Table III it can be seen that all electrodes formed with a supported electrocatalyst out-performed the platinum black electrode 404. Comparing the unpressed control electrode 285 with the unpressed electrode 353 formed according to our invention, it can be seen that our inventive electrode was approximately 25 percent superior. Comparing the pressed electrodes formed according to our invention with pressed control electrode 286, it can be seen that higher currents per unit of platinum were obtainable with all electrodes formed according to our invention, except electrode numbers 336, 334, 348, 324, 366, and 376. Of these electrodes all out-performed the control electrode at the higher current densities. The post heat treated electrode was noted to yield exceptional current output per unit of platinum, nearly doubling the output of the control 286. The most efficient electrodes tested were electrodes 444 and 473, each containing 5 percent by weight calcium meta silicate—a material having elongated crystalline particles. It is noted that electrode 473, which utilized also the post heat treatment was further improved in performance. All voltages reported in Table III are free of internal resistive losses. Resistive losses were determined using a Kordesch-Marko bridge and corroborated using a 1,000 cycle bridge, both techniques being well known to the art.

foam and forms a platinum catalyst coating on the pore network of the finished electrode.

The above substrate was pasted with a mixture containing 0.194 gram of plain boron carbide, 0.048 gram of Teflon and sufficient water to form a consistency suitable for pasting. After drying, the electrode (1⅞ inch in diameter) was press-cured at 350° C. under 8,000 lbs. force for 2 minutes. The nickel foam was leached out in 10 volume percent aqueous nitric acid. After rinsing, the electrode was sprayed with a Teflon film of 2.4 mg./cm.² on the leached foam side.

While it is considered that the foregoing description of our invention is sufficiently complete as to allow its practice, in order to resolve any doubts as to completeness, we wish to incorporate by reference the disclosures of commonly assigned, earlier filed patent applications Niedrach et al., Ser. No. 232,689 now Pat. No. 3,432,355, filed Oct. 24, 1962; Grubb, Ser. No. 492,226, now abandoned, filed Oct. 1, 1965; and Weininger et al., Ser. No. 546,677, now abandoned, filed May 2, 1966.

While we have described our invention with reference to certain preferred embodiments, it is appreciated that numerous variations will readily occur to those having ordinary skill in the art. It is accordingly intended that the scope of our invention be determined with reference to the following claims:

What we claim as new and desire to secure by Letters Patent of the United States is:

1. A method for producing an electrode comprising associating a current collector with a less noble metal open cellular structural foam, introducing into the voids of at least the open structural cellular foam an electrocatalytically active mass, selectively removing at least a portion of the open cellular foam thereby forming an internal pore network having the geometric configuration of the open cellular foam, applying a reactant permeable hydrophobic polymer film to a major surface of the elec-

TABLE III

| Electrode No.: | Ma./mg. Pt. at 0.7 v. | Ma./cm.² at 0.7 v. | Potential at 75.5 ma./cm.² and R.T. | Potential at 75.5 ma./cm.² and 80° C | Potential at 200 ma./cm.² | Potential at 400 ma./cm.² (volts) | Potential at 790 ma./cm.² (volts) | K-M. bridge int. res., ohms |
|---|---|---|---|---|---|---|---|---|
| 404 | 8.1 | 365 | 0.82 | 0.86 | 0.76 | 0.69 | 0.38 | 0.115 |
| 285 | 36.6 | 209 | 0.78 | (¹) | 0.71 | 0.49 | (²) | 0.130 |
| 286 | 30.4 | 148 | 0.76 | 0.81 | 0.66 | 0.13 | (¹) | 0.112 |
| 586 | 37.7 | 157 | 0.75 | 0.81 | 0.68 | 0.59 | 0.06 | 0.111 |
| 325 | 38.1 | 83 | 0.71 | 0.77 | 0.65 | 0.59 | (¹) | 0.125 |
| 336 | 18.4 | 33 | 0.65 | 0.72 | 0.60 | 0.53 | 0.41 | 0.195 |
| 449 | 36.5 | 165 | 0.74 | 0.796 | 0.69 | 0.63 | 0.45 | 0.124 |
| 345 | 32.6 | 50 | 0.68 | (¹) | 0.61 | 0.53 | (¹) | 0.235 |
| 353 | 45.5 | 75 | 0.70 | 0.725 | 0.64 | 0.60 | (¹) | 0.118 |
| 334 | 28.6 | 86 | 0.71 | 0.792 | 0.65 | 0.63 | 0.45 | 0.149 |
| 348 | 18.3 | 61 | 0.69 | 0.740 | 0.62 | 0.56 | (¹) | 0.357 |
| 448 | 39.2 | 140 | 0.74 | 0.794 | 0.68 | 0.63 | 0.41 | 0.156 |
| 324 | 13.3 | 30 | 0.63 | (¹) | 0.48 | 0.17 | (¹) | 0.138 |
| 413 | 45.3 | 170 | 0.75 | 0.806 | 0.69 | 0.66 | 0.57 | 0.130 |
| 415 | 52.9 | 215 | 0.76 | 0.812 | 0.71 | 0.66 | 0.56 | 0.128 |
| 366 | 14.4 | 67 | 0.68 | (¹) | 0.51 | 0.27 | (¹) | 0.105 |
| 330 | 55.1 | 80 | 0.70 | (¹) | 0.66 | 0.63 | (¹) | 0.123 |
| 376 | 24.0 | 57 | 0.68 | 0.755 | 0.64 | 0.62 | 0.51 | 0.142 |
| 377 | 35.6 | 85 | 0.71 | 0.775 | 0.65 | 0.62 | 0.50 | 0.131 |
| 414 | 59.4 | 255 | 0.77 | 0.821 | 0.72 | 0.67 | 0.59 | 0.117 |
| 436 | 33.4 | 105 | 0.71 | 0.780 | 0.67 | 0.65 | 0.57 | 0.145 |
| 461 | 58.5 | 115 | 0.72 | 0.780 | 0.68 | 0.66 | 0.55 | 0.102 |
| 469 | 32.9 | 110 | 0.72 | 0.787 | 0.66 | 0.56 | 0.09 | 0.106 |
| 444 | 68.6 | 225 | 0.76 | 0.813 | 0.71 | 0.65 | 0.53 | 0.120 |
| 446 | 50.4 | 165 | 0.75 | 0.795 | 0.69 | 0.66 | 0.59 | 0.134 |
| 473 | 72.6 | 265 | 0.76 | 0.817 | 0.71 | 0.69 | 0.58 | 0.097 |

¹ No test.
² Cut off below 790 ma./cm.³.

To further illustrate the scope of our invention, electrode 340 was prepared according to the following procedure. A nickel foam weighing 0.838 gram and pressed into a platinum current collector screen at 20,000 lbs. force was coated with platinum on its strand surfaces by immersing it in a solution containing 0.085 gram of $H_2PtCl_6 \cdot 3.7H_2O$ (40% Pt by weight) and 200 ml. of water. Platinum self-deposits onto nickel by a well-known displacement reaction because it is more noble than nickel. It is not removed during subsequent leaching of the nickel trode structure, and curing the film at an elevated temperature thereby providing an electrode.

2. A method according to claim 1, in which finely-divided particles of a selectively removable additive are incorporated into the active mass, and subsequently removing partially such particles from the electrode structure prior to the application of the hydrophobic film thereon.

3. A method for producing an electrode comprising associating a current collector with a less noble metal open cellular structural foam, preparing an electrocatalytically active mass by blending an electronically conductive, electrocatalytically active material with a binder, introducing the mixture into the voids of at least the open cellular structural foam, sintering the binder at an elevated temperature thereby bonding the active particles together and to the current collector, selectively removing at least a portion of the open cellular foam thereby forming an internal pore network having the geometric configuration of the open cellular foam, applying a reactant permeable hydrophobic polymer film to one of the major surfaces of the electrode structure, and curing the film at an elevated temperature thereby providing an electrode.

4. A method according to claim 3, in which finely-divided particles of a selectively removable additive are incorporated in the active mass, and subsequently at least partially removing such particles from the electrode structure prior to the application of the hydrophobic film thereon.

References Cited

UNITED STATES PATENTS

| | | | |
|---|---|---|---|
| 3,432,355 | 3/1969 | Niedrach et al. | 136—86 |
| 2,928,891 | 3/1960 | Justi et al. | 136—86 |
| 3,060,254 | 10/1962 | Urry | 136—24 |
| 3,150,011 | 9/1964 | Winsel et al. | 136—120 |
| 3,158,510 | 11/1964 | Talvenheim | 136—122 |
| 3,266,893 | 8/1966 | Duddy | 75—222 |
| 3,274,031 | 9/1966 | Maget et al. | 136—120 |
| 3,287,166 | 11/1966 | Arrange | 136—68 |
| 3,311,508 | 3/1967 | Biddick et al. | 136—120 |

WINSTON A. DOUGLAS, Primary Examiner

A. SKAPARS, Assistant Examiner

U.S. Cl. X.R.

75—20; 29—183